(12) United States Patent
Gaver et al.

(10) Patent No.: US 8,959,175 B2
(45) Date of Patent: *Feb. 17, 2015

(54) METHOD, DEVICE AND SYSTEM FOR CREATING A VIRTUAL LOCAL SOCIAL NETWORK

(71) Applicant: Loyalblocks Ltd., Tel Aviv (IL)

(72) Inventors: Ido Gaver, Even Yehuda (IL); Eran Kirshenboim, Kfar Saba (IL); Aner Armon, Kfar-Hess (IL)

(73) Assignee: Loyalblocks Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,899

(22) Filed: Oct. 23, 2012

(65) Prior Publication Data

US 2013/0173704 A1 Jul. 4, 2013

Related U.S. Application Data

(63) Continuation of application No. 12/324,863, filed on Nov. 27, 2008, now Pat. No. 8,321,525.

(60) Provisional application No. 60/990,309, filed on Nov. 27, 2007.

(51) Int. Cl.
| | |
|---|---|
| *G06F 15/16* | (2006.01) |
| *H04L 29/06* | (2006.01) |
| *G06Q 10/10* | (2012.01) |
| *H04W 4/00* | (2009.01) |
| *H04W 4/20* | (2009.01) |
| *H04W 4/02* | (2009.01) |
| *H04L 29/08* | (2006.01) |

(52) U.S. Cl.
CPC .............. *H04L 65/403* (2013.01); *G06Q 10/10* (2013.01); *H04W 4/00* (2013.01); *H04W 4/206* (2013.01); *H04W 4/02* (2013.01); *H04W 4/021* (2013.01); *H04L 67/306* (2013.01)
USPC ......................................................... 709/217

(58) Field of Classification Search
CPC ....... H04L 67/306; H04L 47/14; H04L 67/22; H04L 67/24; H04W 4/02; H04W 4/206; H04W 4/021; G06Q 30/0261; G06Q 30/0267; G06Q 30/0241; G06Q 30/0254; G06Q 30/0255
USPC ......... 709/217–219; 455/553.1, 554.1, 554.2, 455/555
See application file for complete search history.

(56) References Cited

U.S. PATENT DOCUMENTS

| | | | | |
|---|---|---|---|---|
| 7,185,204 | B2* | 2/2007 | Narayanaswami et al. ... | 713/182 |
| 7,263,076 | B1* | 8/2007 | Leibovitz et al. ............. | 370/310 |
| 7,454,464 | B2* | 11/2008 | Puthenkulam et al. ....... | 709/204 |
| 7,673,327 | B1* | 3/2010 | Polis et al. ........................ | 726/5 |
| 7,729,366 | B2* | 6/2010 | Mok et al. ..................... | 370/401 |

(Continued)

*Primary Examiner* — Backhean Tiv
(74) *Attorney, Agent, or Firm* — Vladimir Sherman; Professional Patent Solutions

(57) ABSTRACT

There is provided a system and method for creating a local social network, based on a user's location and a user's virtual social profile (e.g. a facebook profile, a myspace profile) on a virtual social network (e.g. facebook, myspace). The method includes the steps of: (1) associating a communication device with a user's virtual profile, (2) detecting a communication device within an interactive region, (3) extracting unique parameters of the communication device, (4) retrieving data associated with the communication device and with the user's virtual profile, and (5) initiating data transfer based on the retrieved data.

15 Claims, 16 Drawing Sheets

(56) References Cited

U.S. PATENT DOCUMENTS

| | | | |
|---|---|---|---|
| 8,331,979 B2* | 12/2012 | Hamano et al. | 455/552.1 |
| 8,369,782 B1* | 2/2013 | Lin et al. | 455/41.2 |
| 8,611,317 B2* | 12/2013 | Banerjea et al. | 370/338 |
| 2003/0105719 A1* | 6/2003 | Berger et al. | 705/51 |
| 2004/0004967 A1* | 1/2004 | Nakatsugawa et al. | 370/400 |
| 2005/0113102 A1* | 5/2005 | Kwon et al. | 455/450 |
| 2005/0256766 A1* | 11/2005 | Garcia et al. | 705/14 |
| 2006/0094364 A1* | 5/2006 | Hirota et al. | 455/66.1 |
| 2006/0104262 A1* | 5/2006 | Kant et al. | 370/352 |
| 2006/0149624 A1* | 7/2006 | Baluja et al. | 705/14 |
| 2006/0172769 A1* | 8/2006 | Oh | 455/557 |
| 2006/0268926 A1* | 11/2006 | Zanaty | 370/463 |
| 2006/0292986 A1* | 12/2006 | Bitran et al. | 455/41.2 |
| 2007/0021066 A1* | 1/2007 | Dravida et al. | 455/41.2 |
| 2007/0066280 A1* | 3/2007 | Arai | 455/411 |
| 2007/0167174 A1* | 7/2007 | Halcrow et al. | 455/456.2 |
| 2008/0056226 A1* | 3/2008 | Zhao et al. | 370/342 |
| 2008/0057912 A1* | 3/2008 | Deprun | 455/413 |
| 2008/0113674 A1* | 5/2008 | Baig | 455/456.3 |
| 2008/0181187 A1* | 7/2008 | Scott et al. | 370/338 |
| 2009/0017798 A1* | 1/2009 | Pop | 455/414.1 |
| 2009/0109941 A1* | 4/2009 | Carter | 370/338 |
| 2010/0107225 A1* | 4/2010 | Spencer et al. | 726/4 |
| 2010/0299615 A1* | 11/2010 | Miluzzo et al. | 715/752 |
| 2011/0090842 A1* | 4/2011 | Hirano et al. | 370/328 |
| 2011/0256889 A1* | 10/2011 | Polis et al. | 455/456.3 |
| 2011/0289153 A1* | 11/2011 | Hull et al. | 709/205 |
| 2011/0289574 A1* | 11/2011 | Hull et al. | 726/7 |

* cited by examiner

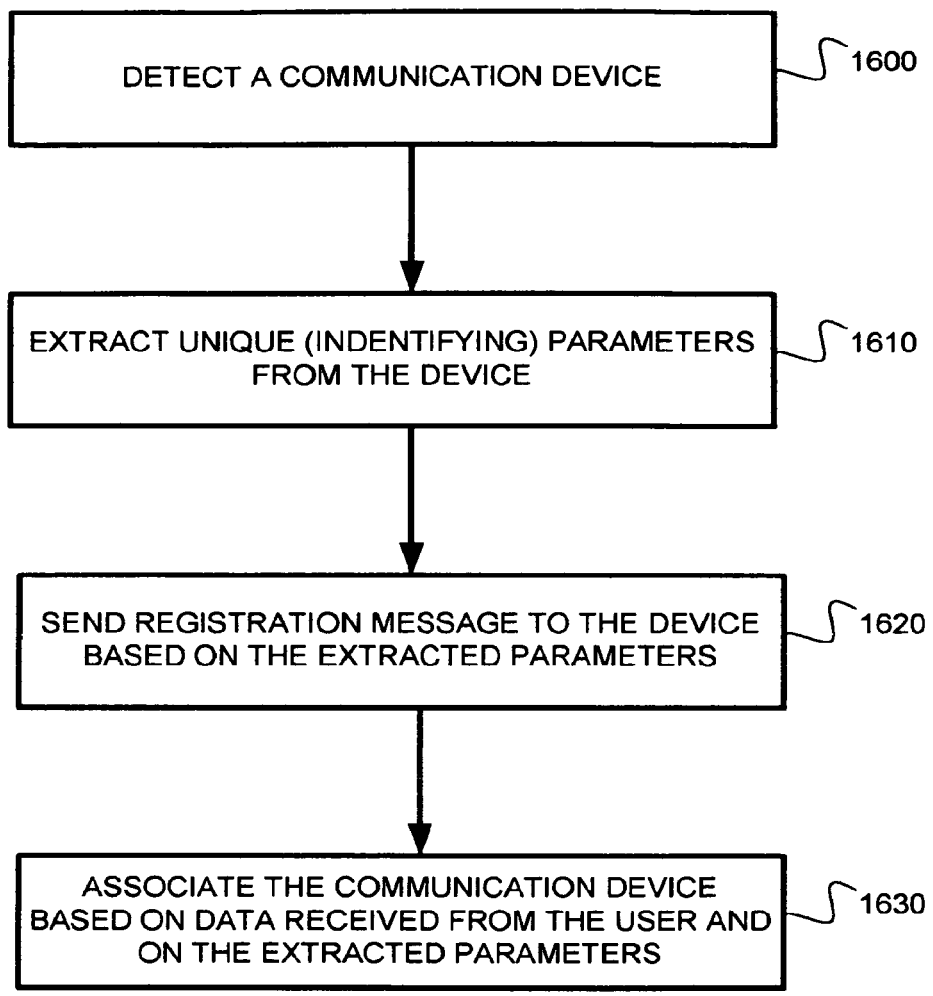

METHOD, DEVICE AND SYSTEM FOR CREATING A VIRTUAL LOCAL SOCIAL NETWORK

CROSS REFERENCE TO RELATED APPLICATIONS

This application is a continuation of U.S. patent application Ser. No. 12/324,863 (U.S. Pat. No. 8,321,525), filed on Nov. 27, 2008 and further claims priority from U.S. Provisional Patent Application No. 60/990,309, filed on Nov. 27, 2007, which hereby incorporated into the present application in their entirety.

FIELD OF THE INVENTION

The present invention relates generally to the field of creating a local virtual social network. More specifically, the present invention relates to a network, method and system creating a local virtual social network.

SUMMARY OF THE INVENTION

There is provided a system and method for creating a local social network, based on a user's location and a user's virtual social profile (e.g. a facebook profile, a myspace profile). The method includes the steps of: (1) associating a communication device with a user's virtual profile, (2) detecting a communication device within an interactive region, (3) extracting unique parameters of the communication device, (4) retrieving data associated with the communication device and with the user's virtual profile, and (5) initiating data transfer based on the retrieved data.

Turning now to FIGS. 1 and 2 there are shown portions of the system including: an application running on a computing device and a remote virtual network server. The system according to FIGS. 1 and 2 may best be described in conjunction with FIG. 3, there is shown a flow chart depicting the step of an application associated with the present invention. According to some embodiments of the present invention, the application may be adapted to: (A) associate a communication device with a user's virtual profile (step 3000), and (B) update a database based on the association (step 3100), both steps will be further explained herein below.

According to some embodiments of the present invention, the system may include an application as shown in FIG. 1 (e.g. software application), which application may be associated and/or functionally coupled with a virtual social network. The application may generate an association/coupling between a (user's) communication device (e.g. cell phone, PDA, etc.) and the users virtual social profile. According to further embodiments of the present invention, the association may be between the user's virtual profile and specific parameters of the user's communication device. The parameters of the user's communication device may be: phone number, serial number, production number, MAC address of any of the phone communication components (e.g. Bluetooth transceiver MAC address, WiFi MAC address etc.), a unique name, a unique name and password etc. According to some further embodiments of the present invention, the association may be performed semi-automatically, e.g. the computer which the application is processed on, senses/detects the communication device and associates the communication device with the user's virtual profile, or manually, e.g. the user manually enters the parameter (e.g. Bluetooth MAC address) used for the association.

According to further embodiments of the present invention, the association process may include the steps of: (1) selecting the communication device from a list displayed by the application, (2) sending the communication device a unique code, which sending is performed based on physical (e.g. MAC address) identifiers of the communication device and (3) entering the received code in the application.

According to yet further embodiments of the present invention, the user may select during the association process a communication method to be used when his device is detected, that is when his device is detected in an interactive region, selecting whether he will receive SMS's, Bluetooth messages, push mail and/or any other method of transferring data supporting his communication device.

According to some embodiments of the present invention, the system may also include a remote virtual network server, which remote virtual network server may include a database of all the associations of made by the application explained hereinabove. For example, if a user is associating its communication device with his virtual user profile, the association will be stored on the remote virtual local server. According to some embodiments of the present invention, the application ("the association application") may update the database of the remote virtual network server directly or via another network interface as shown in FIG. 2.

Turning now to FIGS. 4 and 5, there are shown different arrangements and setting of the system including in accordance with some embodiments of the present invention. According to some embodiments of the present invention, the system may include a local virtual network server ("local server", "local virtual server") and a set of detectors and/or transceivers (e.g. Bluetooth device detectors, Bluetooth device detectors and transceivers). According to some embodiments of the present invention, the area covered by the set of detectors/transceivers (e.g. the area where a communication device will be detected) is referred to as an "interactive region". According to some embodiments of the present invention, the set of detectors/transceivers may be adapted to detect one or more communication devices within the detection range (e.g. within the interactive region). According to further embodiments of the present invention, the set of detectors/transceivers may be functionally coupled with the local virtual network server in such a way that a list of detected devices within the interactive region may be generated by the local virtual server (e.g. each detector/transceiver will pass the list of detected devices in his range to the local virtual server). According to further embodiments of the present invention, the set of detectors/sensors may be adapted to open a communication session with the detected communication device (e.g. pair Bluetooth device, send an html or text message via Bluetooth, send a VNT file via Bluetooth etc.). According to yet further embodiments of the present invention, the local server may be adapted to open a communication session with the detected communication device via the set of detectors/transceivers or using a remote messaging server.

Turning now to FIG. 6, there is shown yet another arrangement of the present invention, wherein a communication session between the local server and a detected communication device is conducted using a messaging server adapted to send messages to the detected device (e.g. SMS, MMS, Bluetooth, WiFi, IR, WiMax, etc.).

Turning now to FIG. 7, there is shown yet another arrangement of the system, including: a local server, a set of detectors/transceivers, a remote server and a messaging server in accordance with some embodiments of the present invention. The functionality of the system shown in FIG. 7 may best be described in conjunction with FIGS. 8 and 9 there are shown flow charts depicting the steps of a local server and of a remote virtual network server (respectively) in accordance with some embodiments of the present invention.

According to some embodiment of the present invention, a local server may detect a communication device within the interactive region as explained hereinabove and extract from the device unique parameters associated with the device (e.g. when detecting a Bluetooth device, the device's Bluetooth MAC address is extracted, the devices services may be retrieved using SDP etc) (step 8000).

According to some embodiments of the present invention, the local server is adapted to send parameters associated with a detected device(s) to a remote virtual network server (step 8200 and 9000).

According to some embodiments of the present invention, the remote server may look up in a database a user's virtual profile which is associated with a communication device based on the communication device parameters (step 9100).

According to some embodiments of the present invention, the remote server may retrieve data associated with a user's virtual profile (step 9200), the data retrieved may be any type of data which the virtual profile encapsulates (e.g., "friends", "groups" and "communities" the user is a part of, personal details, events, "causes" and/or any other type of data used or defined in a virtual profile)

According to some embodiments of the present invention, the remote server may send data associated with a user's virtual profile, or portions of that data, to a local network server (step 9300), preferably to the local server who detected the communication device within its interactive region (step 8400).

According to some embodiments of the present invention, the local server may be adapted to send and receive data to and from the detected communication device based on (1) the retrieved data and (2) other detected communication device (s) within the interactive region (step 8500). For example, the local server may be adapted to send a message to a communication device which informs the user of that communication device of the presence of other users within the interactive region (users with a virtual profile) and of similarities (e.g. shared communities, shared groups etc.) between the virtual users profiles.

According to yet further embodiments of the present invention, the local server may detect a user's exact location, e.g. by means of triangulation, and inform other users of that location.

According to some embodiments of the present invention, the local server may also include a data base of all detected communication device(s), data associated with the communication devices and data extracted from the activity and data transfer of the communication device within the interactive region. According to further embodiments of the present invention, the local server may hold a list of currently active users within the interactive region, with time stamps indicating the last detection time of a communication device. According to yet further embodiments of the present invention, a communication device may be removed from the list of currently active user if the communication device wasn't detected for a predefined period of time in the interactive region (steps 8600 and 8700).

According to some embodiments of the present invention, the system may include a messaging server, which messaging server may be adapted send data (e.g. SMS's, push mail etc.) to a detected communication device and receive data from a detected communication device, according to yet further embodiment of the present invention, the local server and/or remote server may be adapted to trigger data transfer to and from the messaging server and a detected communication device.

Turning now to FIG. 9, there is shown a remote server adapted to communicate with a set of interactive regions and local servers.

According to some embodiments of the present invention, data sent to a communication device from the local server, remote server, messaging server may be sent using SMS's, MMS's, hyperlinks, Bluetooth messages and/or any other type of message known today or to be devised in the future.

According to some embodiments of the present invention, the detectors\transceivers units may be an independent embedded computer adapted to detect communication device (s) within the range of detection and send parameters between each detector/transceiver unit. According to further embodiment of the present invention, the detectors/transceivers units may be operated in slave mode or in master mode thus enabling the use of efficient network architecture(s) including a master device and slave devices. According to some embodiments of the present invention, a device working in master mode may be adapted to operate as a local server. According to some embodiments of the present invention, a device working in slave mode may be adapted to operate as a local server. According to yet further embodiments of the present invention, the detectors\transceivers units may functionally operate as a remote server and/or messaging server.

According to some embodiments of the present invention, the detectors/transceivers units may be adapted to detect a communication device using a first spectrum (e.g. Bluetooth) and may communicate among them selves using a second spectrum (e.g. WiFi). According to yet further embodiments of the present invention, the detectors/transceivers units may detect and/or communicate using more than one mode of detection (spectrum), for example, a detectors/transceivers unit may be adapted to detect communication device(s) using both Bluetooth detection and Wifi detection. According to further embodiments of the present invention, a detector/transceiver unit may be configured in such a way that will associate it with a specific location.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 16 is a flow chart depicting the steps of an association process between a communication device and the system in accordance with some embodiments of the present invention.

Figure 1:
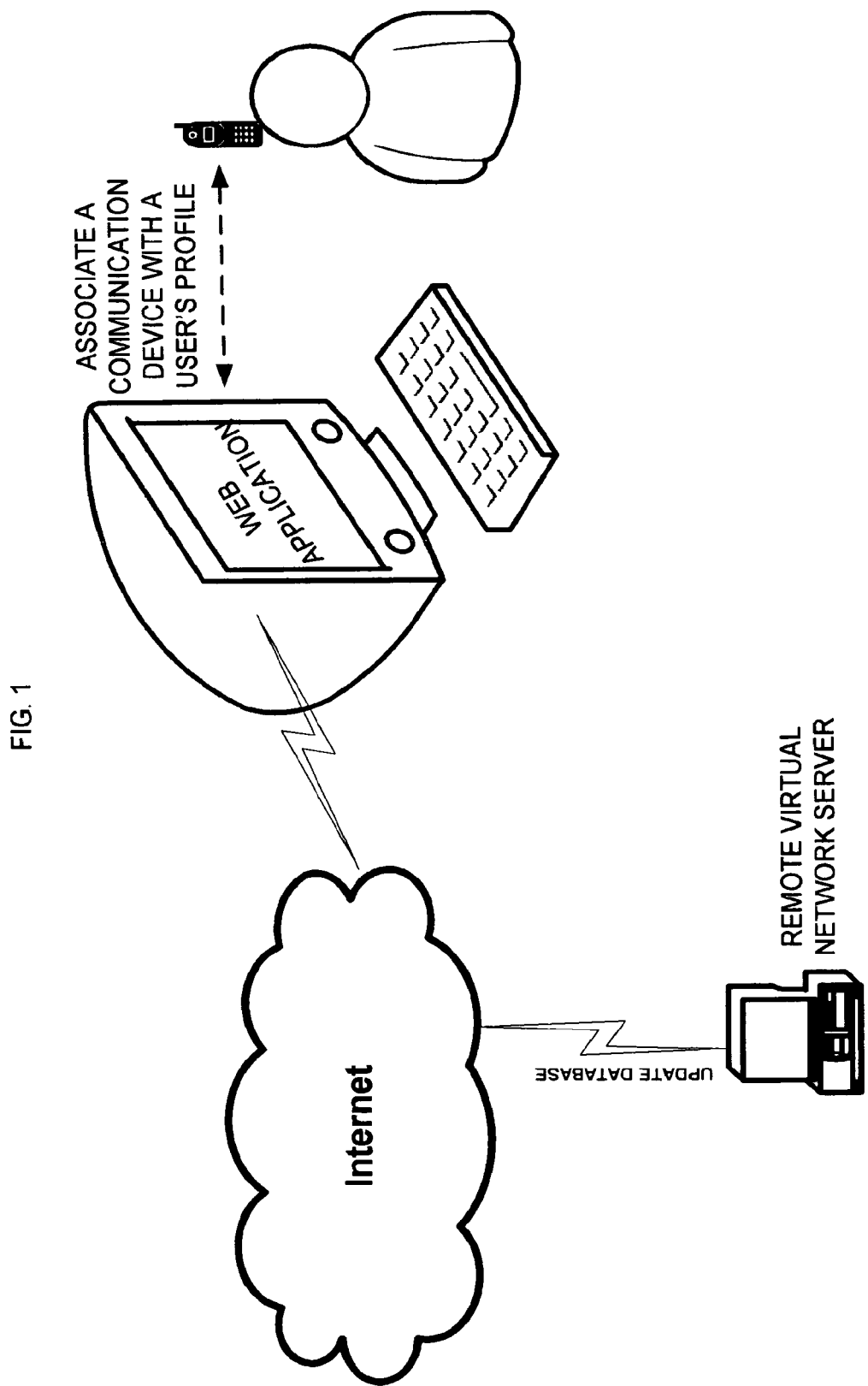
FIG. 1 is a diagram of an exemplary computing device adapted to process an application which is adapted to associate a communication device with a user's virtual profile and update a database on a remote server in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

There is provided a system and method for creating a local social network, based on a user's location and a user's virtual social profile (e.g. a facebook profile, a myspace profile) on a virtual social network (e.g. facebook, myspace). The method includes the steps of: (1) associating a communication device with a user's virtual profile, (2) detecting a communication device within an interactive region, (3) extracting unique parameters of the communication device, (4) retrieving data associated with the communication device and with the user's virtual profile, and (5) initiating data transfer based on the retrieved data.

Figure 2:
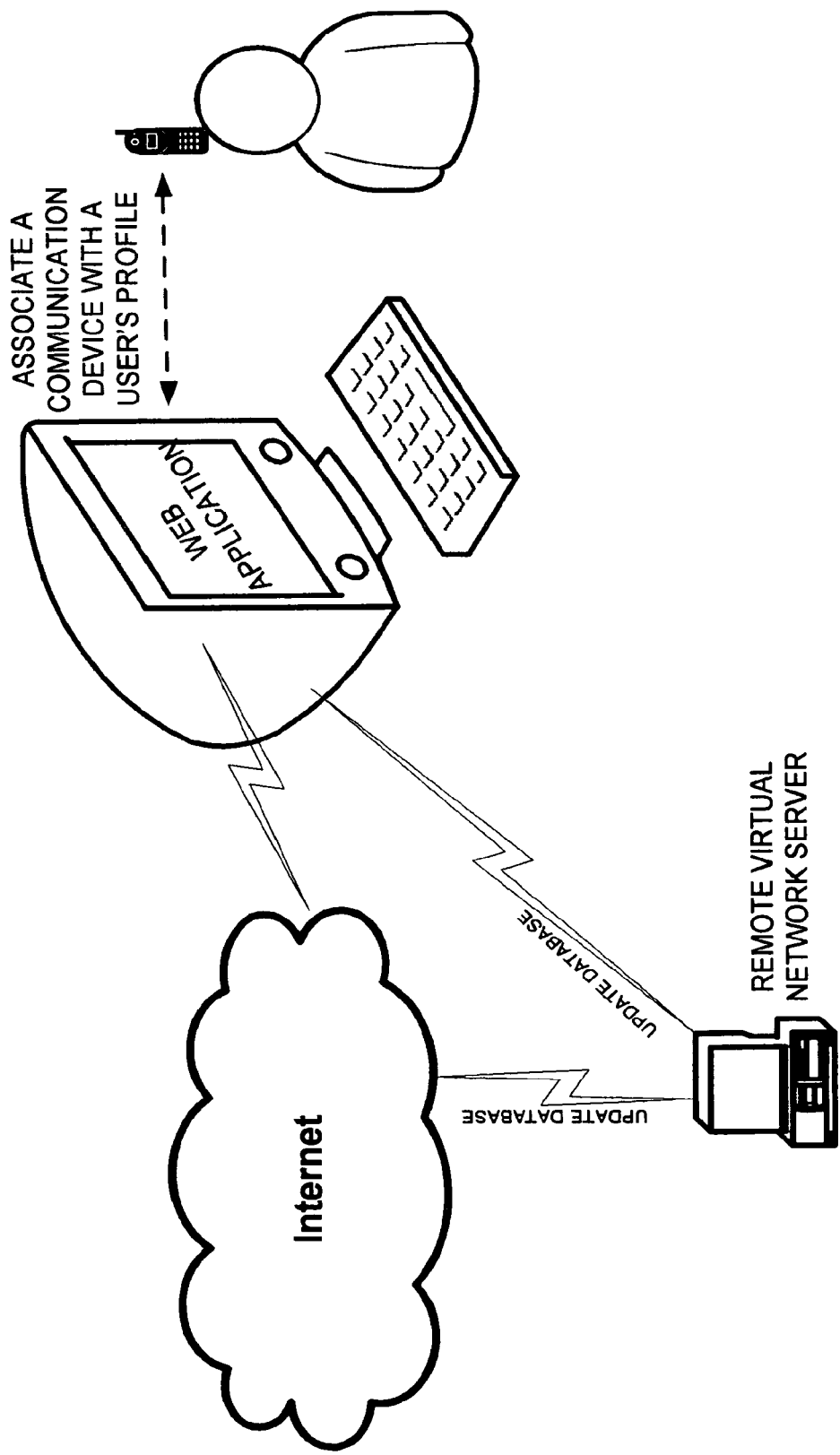
FIG. 2 is a diagram of an exemplary computing device adapted to process an application which is adapted to associate a communication device with a user's virtual profile and update a database on a remote server in accordance with some embodiments of the present invention.
Figure 3:
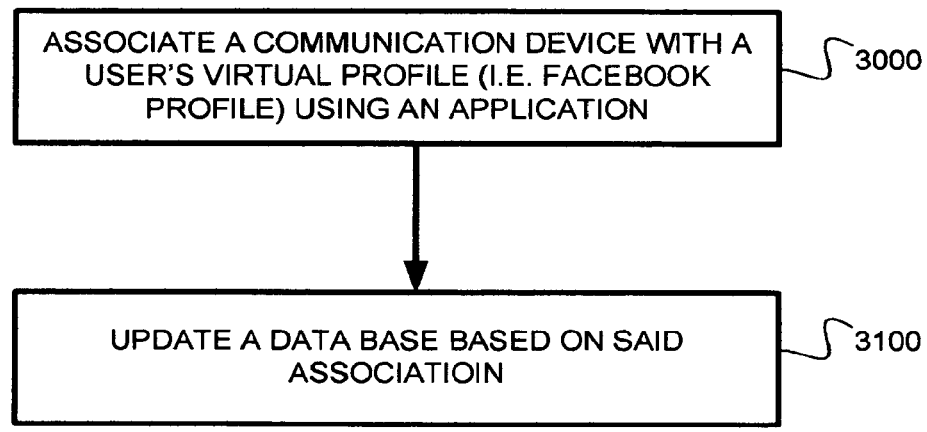
FIG. 3 is a flow chart depicting the steps of an embodiment of the present invention which may be executed by an application adapted to associated a communication device with a user's virtual profile and update a database on a remote server.

Turning now to FIGS. 1 and 2 there are shown portions of the system including: an application running on a computing device and a remote virtual network server. The system according to FIGS. 1 and 2 may best be described in conjunction with FIG. 3, there is shown a flow chart depicting the step of an application associated with the present invention. According to some embodiments of the present invention, the application may be adapted to: (A) associate a communication device with a user's virtual profile (step 3000), and (B) update a database based on the association (step 3100), both steps will be further explained herein below.

According to some embodiments of the present invention, the system may include an application as shown in FIG. 1

(e.g. software application), which application may be associated and/or functionally coupled with a virtual social network. The application may generate an association/coupling between a (user's) communication device (e.g. cell phone, PDA, etc.) and the users virtual social profile. According to further embodiments of the present invention, the association may be between the user's virtual profile and specific parameters of the user's communication device. The parameters of the user's communication device may be: phone number, serial number, production number, MAC address of any of the phone communication components (e.g. Bluetooth transceiver MAC address, WiFi MAC address etc.), a unique name, a unique name and password etc. According to some further embodiments of the present invention, the association may be performed semi-automatically, e.g. the computer which the application is processed on, senses/detects the communication device and associates the communication device with the user's virtual profile, or manually, e.g. the user manually enters the parameter (e.g. Bluetooth MAC address) used for the association.

According to some embodiments of the present invention, the system may also include a remote virtual network server, which remote virtual network server may include a database of all the associations of made by the application explained hereinabove. For example, if a user is associating its communication device with his virtual user profile, the association will be stored on the remote virtual local server. According to some embodiments of the present invention, the application ("the association application") may update the database of the remote virtual network server directly or via another network interface as shown in FIG. 2.

Figure 4:
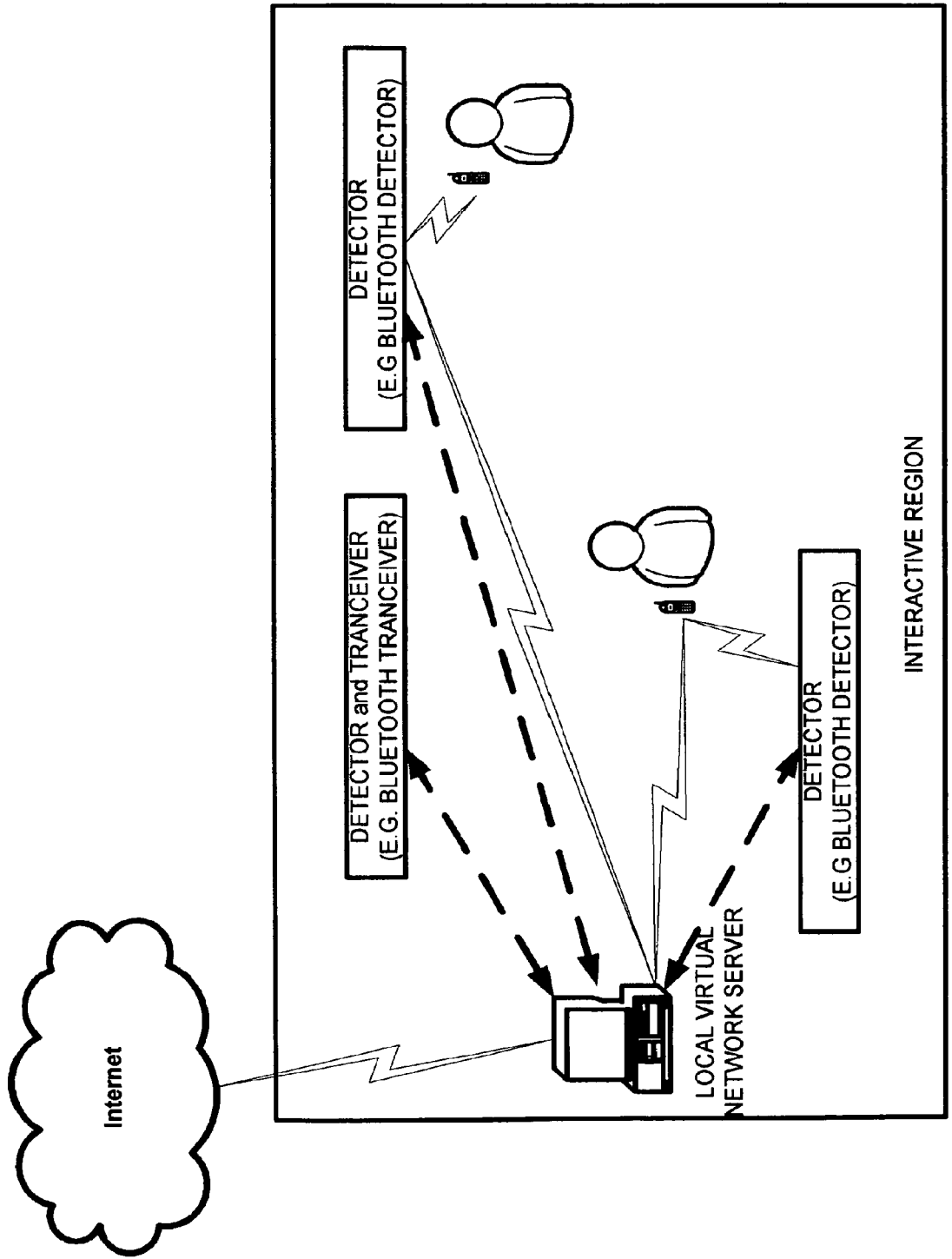
FIG. 4 shows an exemplary arrangement of a local virtual network server functionally coupled with a set of detectors and/or transceiver adapted to detect a communication device within an interactive region and communicate with a network.
Figure 5:
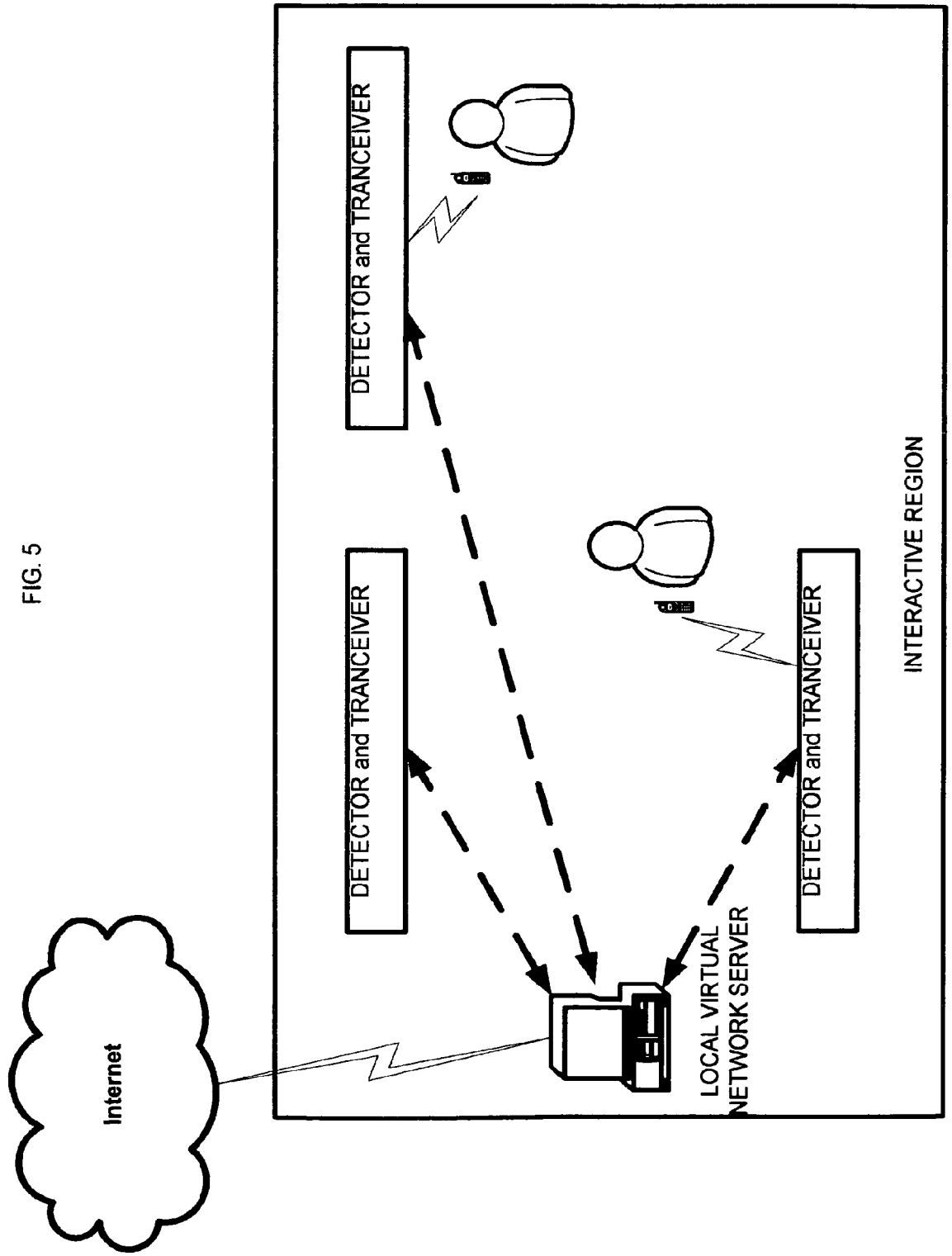
FIG. 5 shows an exemplary arrangement of a local virtual network server functionally coupled with a set of detectors and/or transceiver adapted to detect a communication device within an interactive region and communicate with a network.
Figure 6:
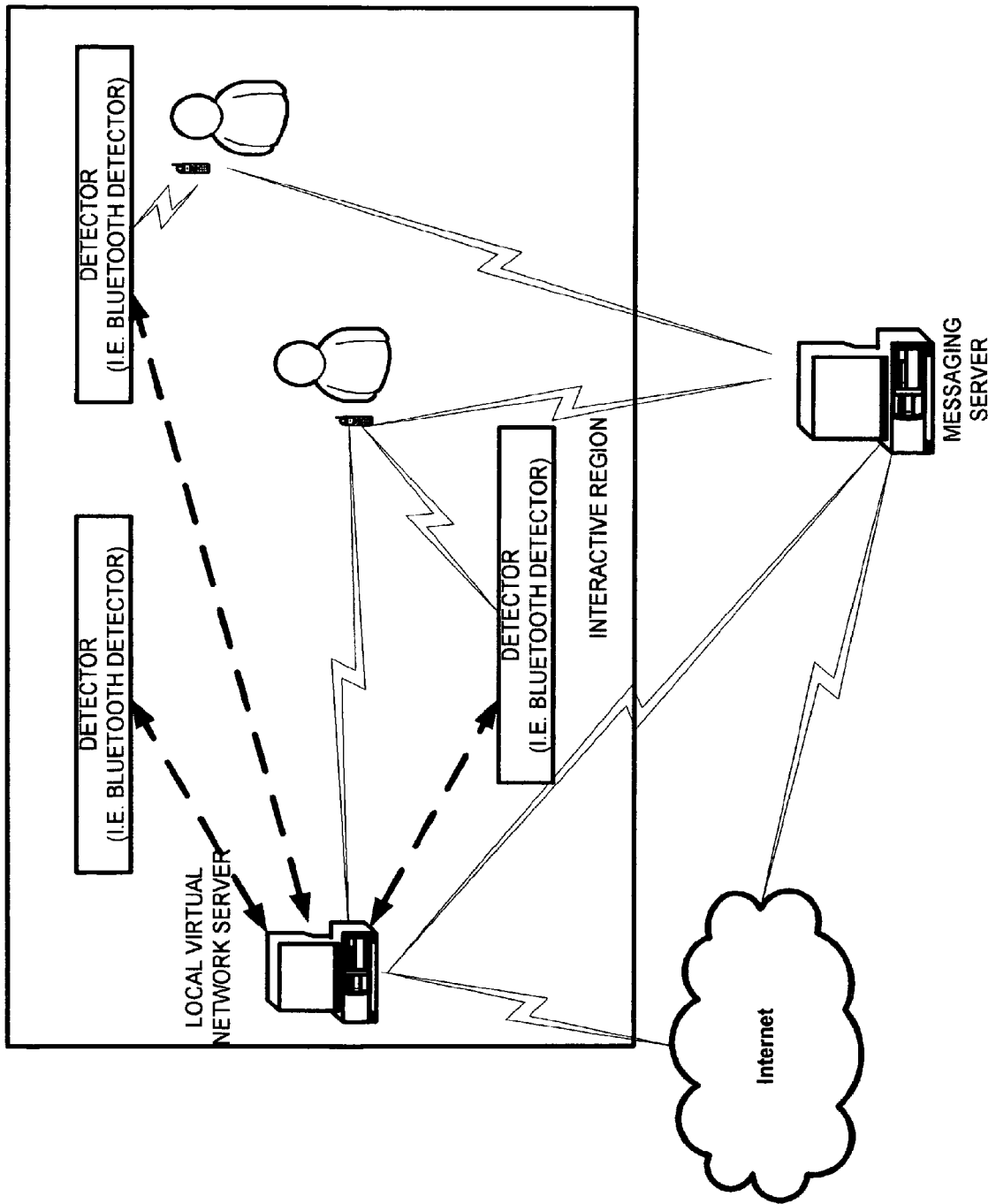
FIG. 6 shows an exemplary arrangement of a local virtual network server functionally coupled with a set of detectors and/or transceiver adapted to detect a communication device within an interactive region, communicate with a network and with a messaging server adapted to transfer data to and from communication device(s)

Turning now to FIGS. 4 and 5, there are shown different arrangements and setting of the system including in accordance with some embodiments of the present invention. According to some embodiments of the present invention, the system may include a local virtual network server ("local server", "local virtual server") and a set of detectors and/or transceivers (e.g. Bluetooth device detectors, Bluetooth device detectors and transceivers). According to some embodiments of the present invention, the area covered by the set of detectors/transceivers (e.g. the area where a communication device will be detected) is referred to as an "interactive region". According to some embodiments of the present invention, the set of detectors/transceivers may be adapted to detect one or more communication devices within the detection range (e.g. within the interactive region). According to further embodiments of the present invention, the set of detectors/transceivers may be functionally coupled with the local virtual network server in such a way that a list of detected devices within the interactive region may be generated by the local virtual server (e.g. each detector/transceiver will pass the list of detected devices in his range to the local virtual server). According to further embodiments of the present invention, the set of detectors/sensors may be adapted to open a communication session with the detected communication device (e.g. pair Bluetooth device). According to yet further embodiments of the present invention, the local server may be adapted to open a communication session with the detected communication device via the set of detectors/transceivers or directly. Turning now to FIG. 6, there is shown yet another arrangement of the present invention, wherein a communication session between the local server and a detected communication device is conducted using a messaging server adapted to send messages to the detected device (e.g. SMS, MMS, Bluetooth, WiFi, IR, etc.).

Figure 7:
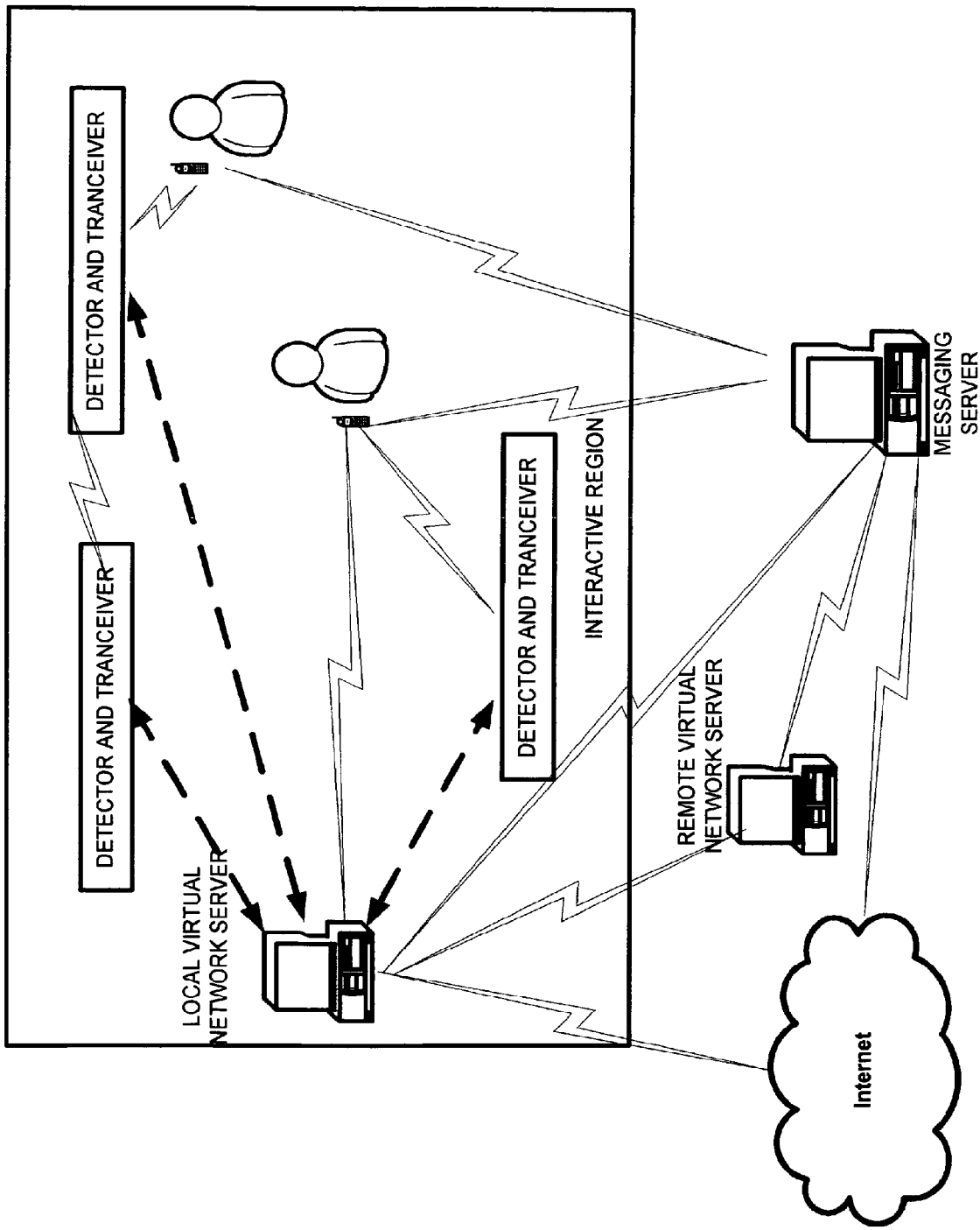
FIG. 7 shows an exemplary arrangement of a local virtual network server functionally coupled with a set of detectors and/or transceiver adapted to detect a communication device within an interactive region, communicate with a network, with a messaging server adapted to transfer data to and from communication device(s) and with a remote virtual network server.
Figure 8:
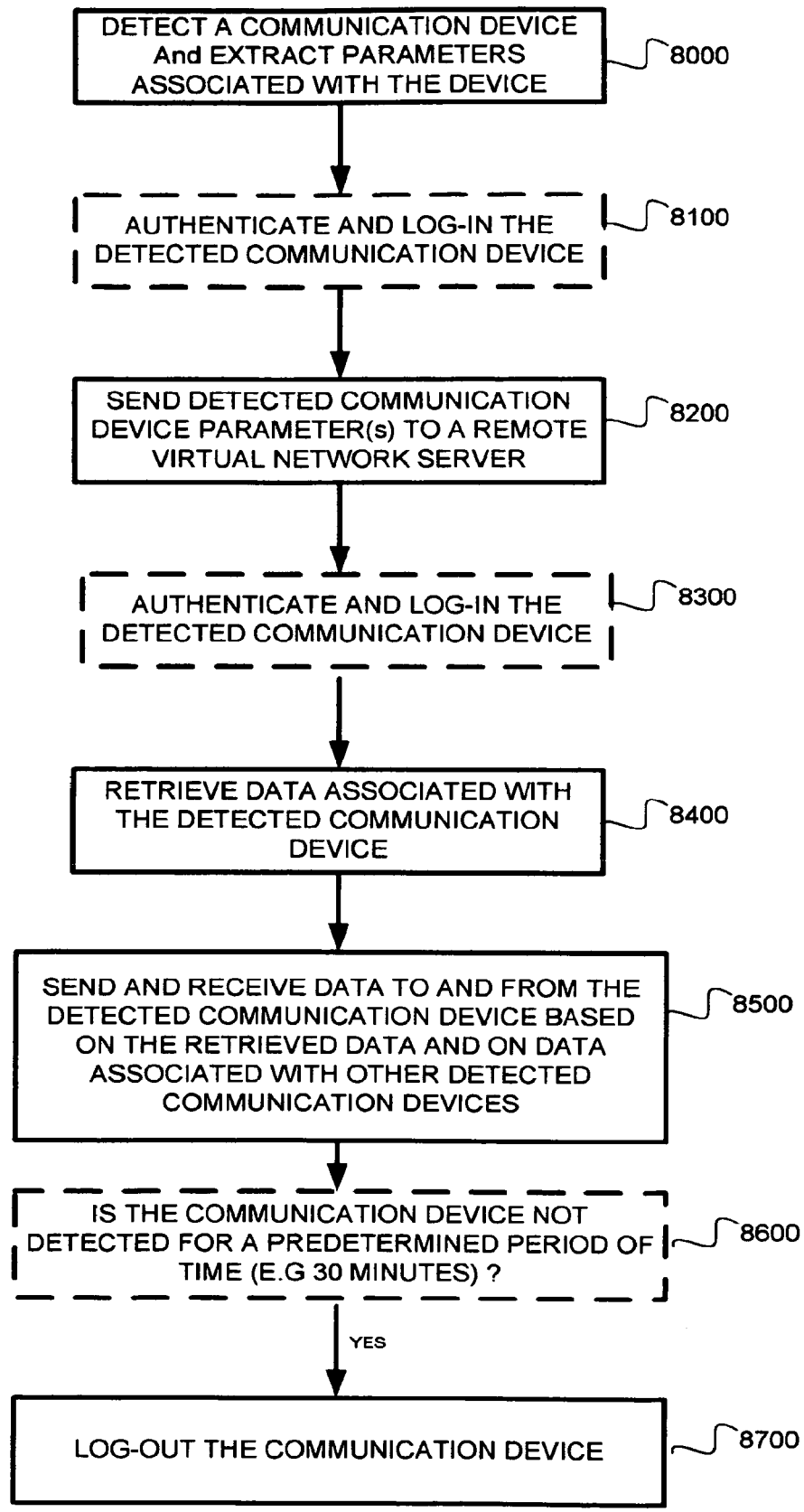
FIG. 8 is a flow chart depicting the step of a local virtual network server in accordance with some embodiments of the present invention.
Figure 9:
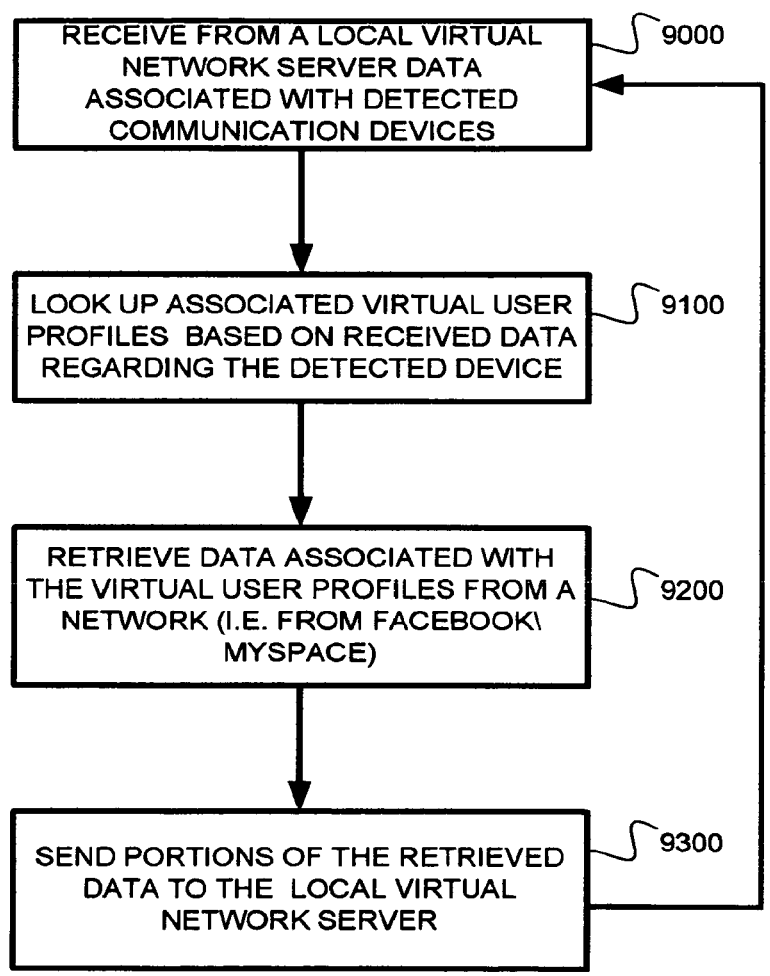
FIG. 9 is a flow chart depicting the step of a remote virtual network server in accordance with some embodiments of the present invention.

Turning now to FIG. 7, there is shown yet another arrangement of the system, including: a local server, a set of detectors/transceivers, a remote server and a messaging server in accordance with some embodiments of the present invention. The functionality of the system shown in FIG. 7 may best be described in conjunction with FIGS. 8 and 9 there are shown flow charts depicting the steps of a local server and of a remote virtual network server (respectively) in accordance with some embodiments of the present invention.

According to some embodiment of the present invention, a local server may detect a communication device within the interactive region as explained hereinabove and extract from the device unique parameters associated with the device (e.g. when pairing with a Bluetooth device, the device's Bluetooth MAC address is extracted) (step 8000).

According to some embodiments of the present invention, the local server is adapted to send parameters associated with a detected device(s) to a remote virtual network server (step 8200 and 9000).

According to some embodiments of the present invention, the remote server may look up in a data a user's virtual profile which is associated with a communication device based on the communication device parameters (step 9100).

According to some embodiments of the present invention, the remote server may retrieve data associated with a user's virtual profile (step 9200), the data retrieved may be any type of data which the virtual profile encapsulates (e.g. "groups" and "communities" the user is a part of, personal details, events, "causes" and/or any other type of data used or defined in a virtual profile)

According to some embodiments of the present invention, the remote server may send data associated with a user's virtual profile, or portions of that data, to a local network server (step 9300), preferably to the local server who detected the communication device within its interactive region (step 8400).

According to some embodiments of the present invention, the local server may be adapted to send and receive data to and from the detected communication device based on (1) the retrieved data and (2) other detected communication device (s) within the interactive region (step 8500). For example, the local server may be adapted to send a message to a communication device which informs the user of that communication device of the presence of other users within the interactive region (users with a virtual profile) and of similarities (e.g. shared communities, shared groups etc.) between the virtual users profiles. According to yet further embodiments of the present invention, the local server may detect a user's exact location, e.g. by means of triangulation, and inform other users of that location.

According to some embodiments of the present invention, the local server may also include a data base of all detected communication device(s), data associated with the communication devices and data extracted from the activity and data transfer of the communication device within the interactive region. According to further embodiments of the present invention, the local server may hold a list of currently active users within the interactive region, with time stamps indicating the last detection time of a communication device. According to yet further embodiments of the present invention, a communication device may be removed from the list of currently active user if the communication device wasn't detected for a predefined period of time in the interactive region (steps 8600 and 8700).

According to some embodiments of the present invention, the system may include a messaging server, which messaging server may be adapted send data to a detected communication device and receive data from a detected communication device, according to yet further embodiment of the present invention, the local server and/or remote server may be adapted to trigger data transfer to and from the messaging server and a detected communication device.

Figure 10:
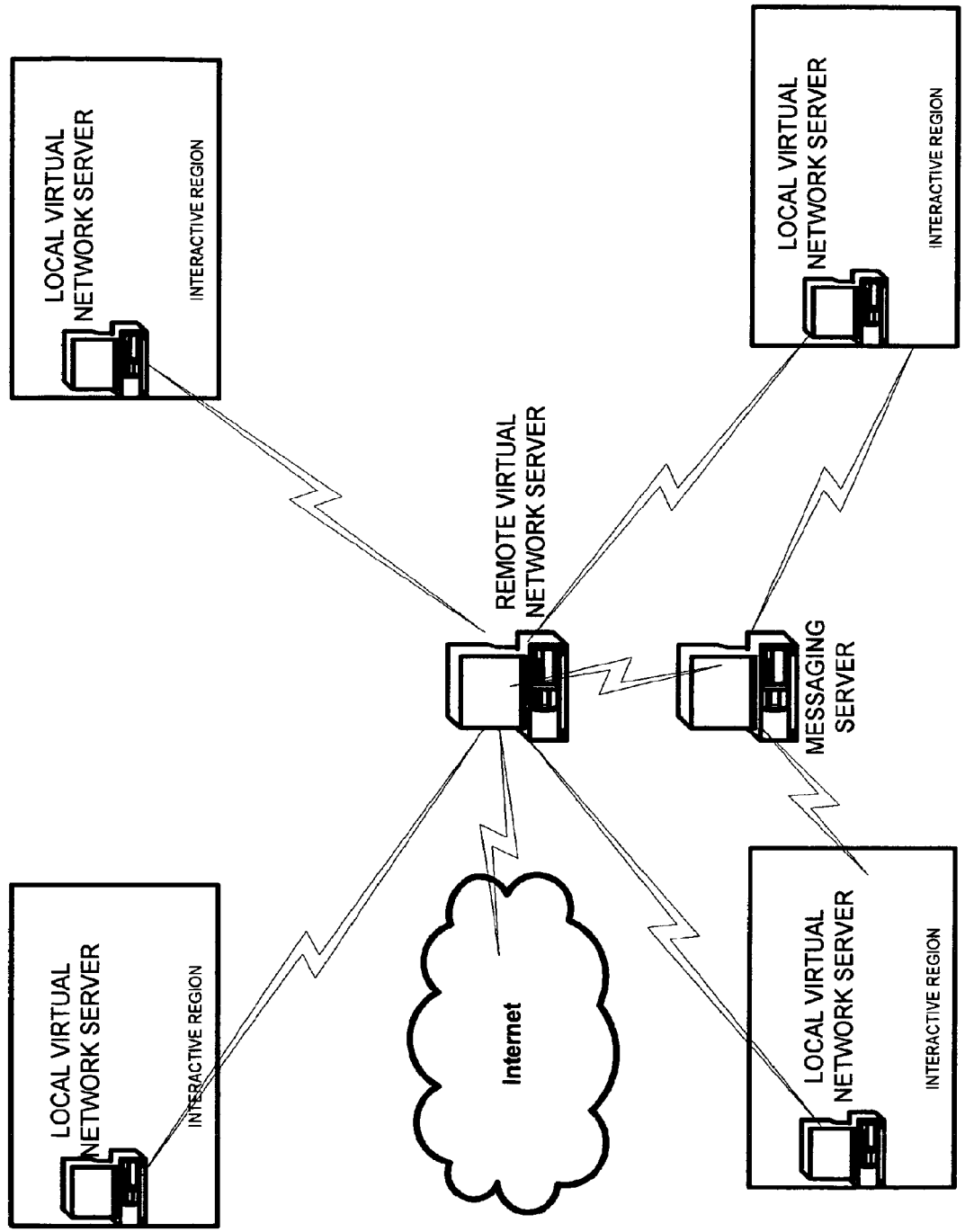
FIG. 10 shows an exemplary arrangement of the system wherein a remote virtual network server is communicating with a plurality of interactive regions and local servers.
Figure 11:
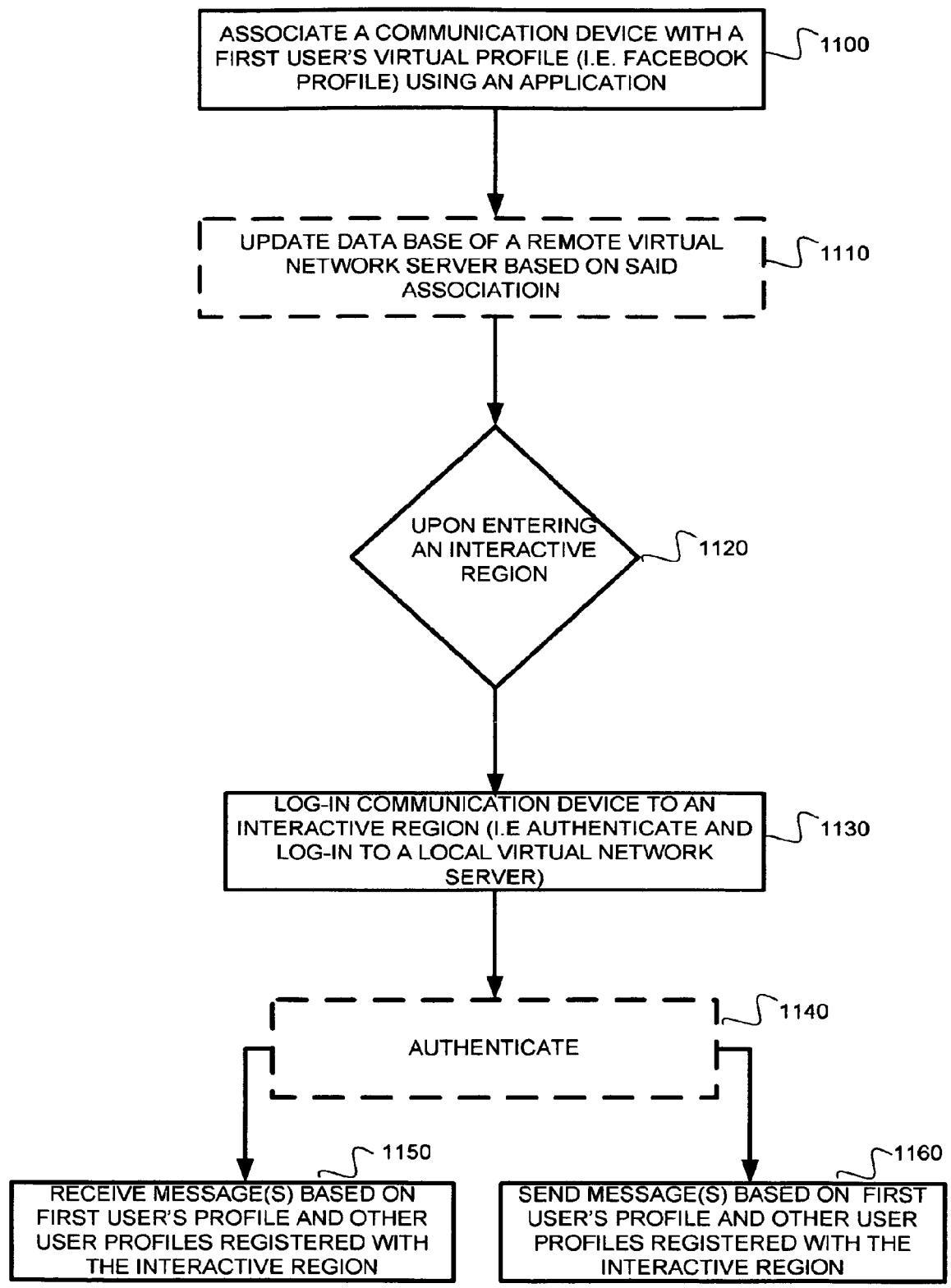
FIG. 11 is a flow chart depicting the steps involving a user's communication device according to some embodiments of the present invention.

Turning now to FIG. 10, there is shown an exemplary arrangement of the system wherein a remote virtual network server is communicating with a plurality of local servers functionally coupled with interactive regions.

According to some embodiments of the present invention, the messaging server may communicate and manage data transferring to one or more local virtual servers in parallel.

Figure 12:
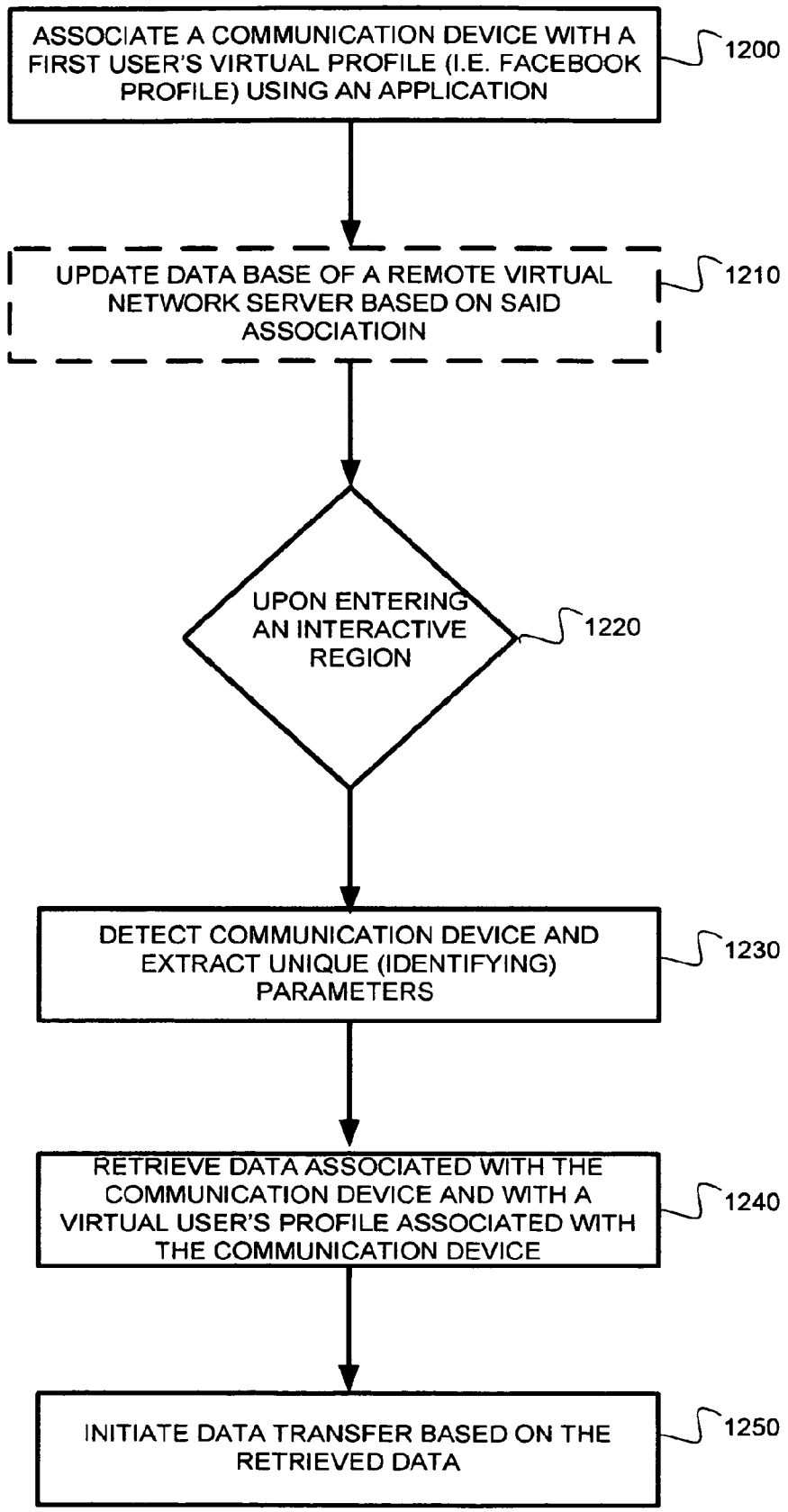
FIG. 12 is a flow chart depicting the steps of an exemplary system in accordance with some embodiments of the present invention.

Turning now to FIG. 12, there is a flow chart depicting the steps of a system in accordance with some embodiments of the present invention, the steps may best be understood in conjunction with FIGS. 10, 13, 14 and 16. According to some embodiments of the present invention, the system may be adapted to associate a communication device with a first virtual profile (step 1200). According to further embodiments of the present invention, the system may be adapted to update a remote database based on said association (step 1210). According to further embodiments of the present invention, the system may be adapted to detect a communication device upon its entering an interactive region (steps 1220 and 1230). According to some embodiments of the present invention, the system may be adapted to extract unique (identifying) parameters of the communication device as described herein above (step 1230). According to some embodiments of the present invention, the system may be adapted to retrieve data (e.g. from the remote database) associated with the communication device (e.g. a virtual user profile) step 1240. According to some embodiments of the present invention, the system may be adapted to initiate and trigger data transfer with one or communication devices based on the retrieved data (step 1250).

Figure 13:
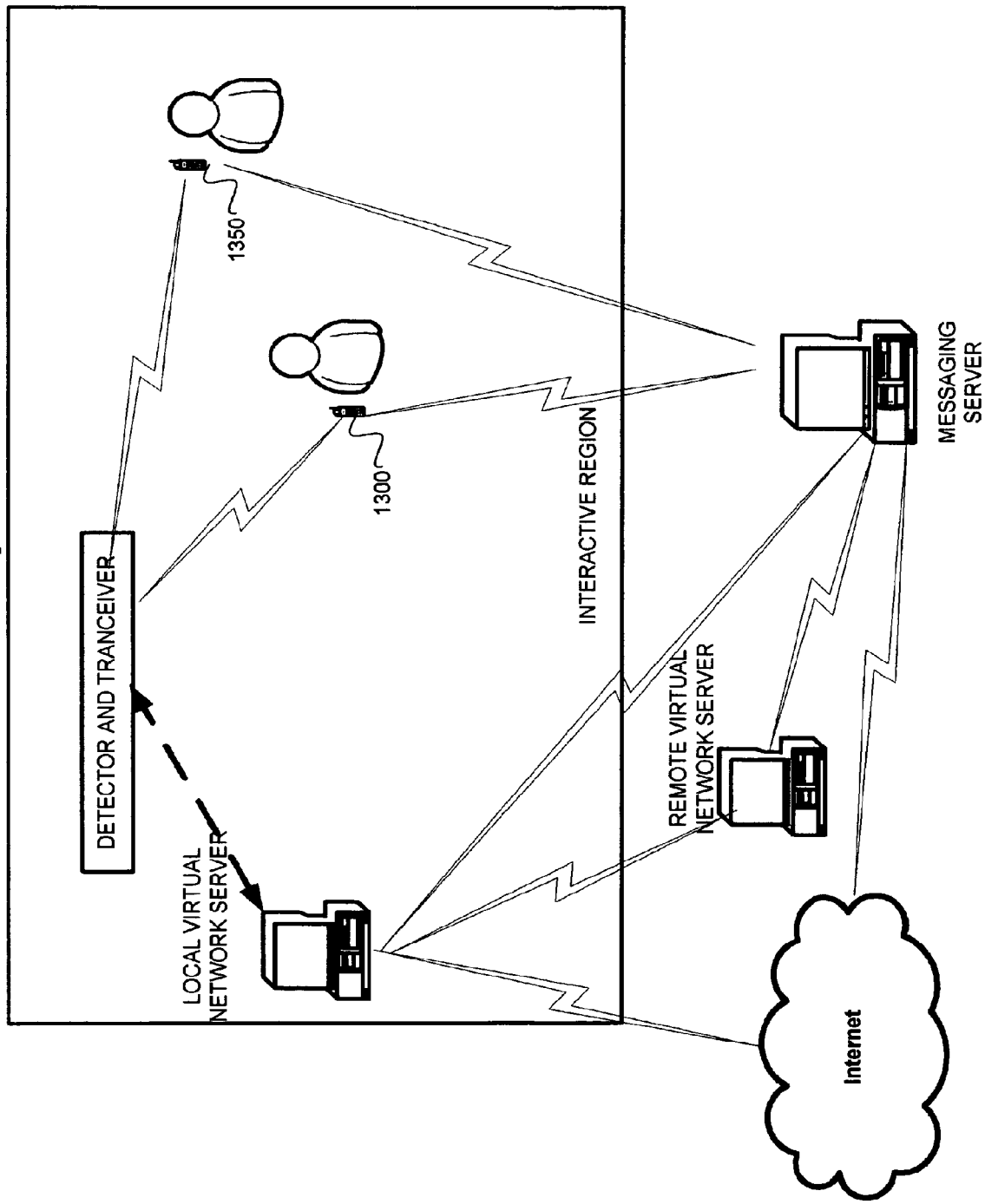
FIG. 13 shows an exemplary arrangement of a system in accordance with some embodiments of the present invention, which system may include a local virtual network server functionally coupled with an electromagnetic radiation detector and an electromagnetic transceiver, a remote virtual network server and a messaging server.

Turning now to FIG. 13, there is shown an exemplary arrangement of a system in accordance with some embodiments of the present invention, which system may include a local virtual network server functionally coupled with an electromagnetic radiation detector and an electromagnetic transceiver, a remote virtual network server and a messaging server.

According to some embodiments of the present invention, the local virtual network server may have a processor and may be coupled to: (1) a memory (2) an electromagnetic radiation detector and (3) an electromagnetic transceiver. According to some embodiments of the present invention, the remote virtual network server may be coupled to a memory. According to some embodiments of the present invention, the local virtual network server may be adapted to detect electromagnetic radiation omitting from a first (1300) and a second (1350) mobile communication device. According to some embodiments of the present invention, the local virtual network server may be adapted to detect, extract and transmit parameters associated with the electromagnetic radiation omitting from the first and second mobile communication device.

According to some embodiments of the present invention, the remote virtual network server is adapted to receive parameters associated with said electromagnetic radiation and retrieve user associated data with said parameters. According to some embodiments of the present invention, the remote virtual network server is adapted to trigger data exchange with the first and second mobile device based on said retrieved user associated data.

According to some embodiments of the present invention, the data exchange may be facilitated using a messaging server. According to some embodiments of the present invention, the electromagnetic radiation may be a Bluetooth radiation, wifi radiation, wimax radiation and/or LTE ("Long Term Evolution").

According to some embodiments of the present invention, the parameters associated with the electromagnetic radiation may include Mac address of the communication device, services provided and enabled ports by the operating system. According to some embodiments of the present invention, the electromagnetic transceiver may be a Bluetooth transceiver, a wifi transceiver a wimax transceiver and/or an LTE transceiver. According to some embodiments of the present invention, the user associated data may include a virtual user profile.

Figure 14:
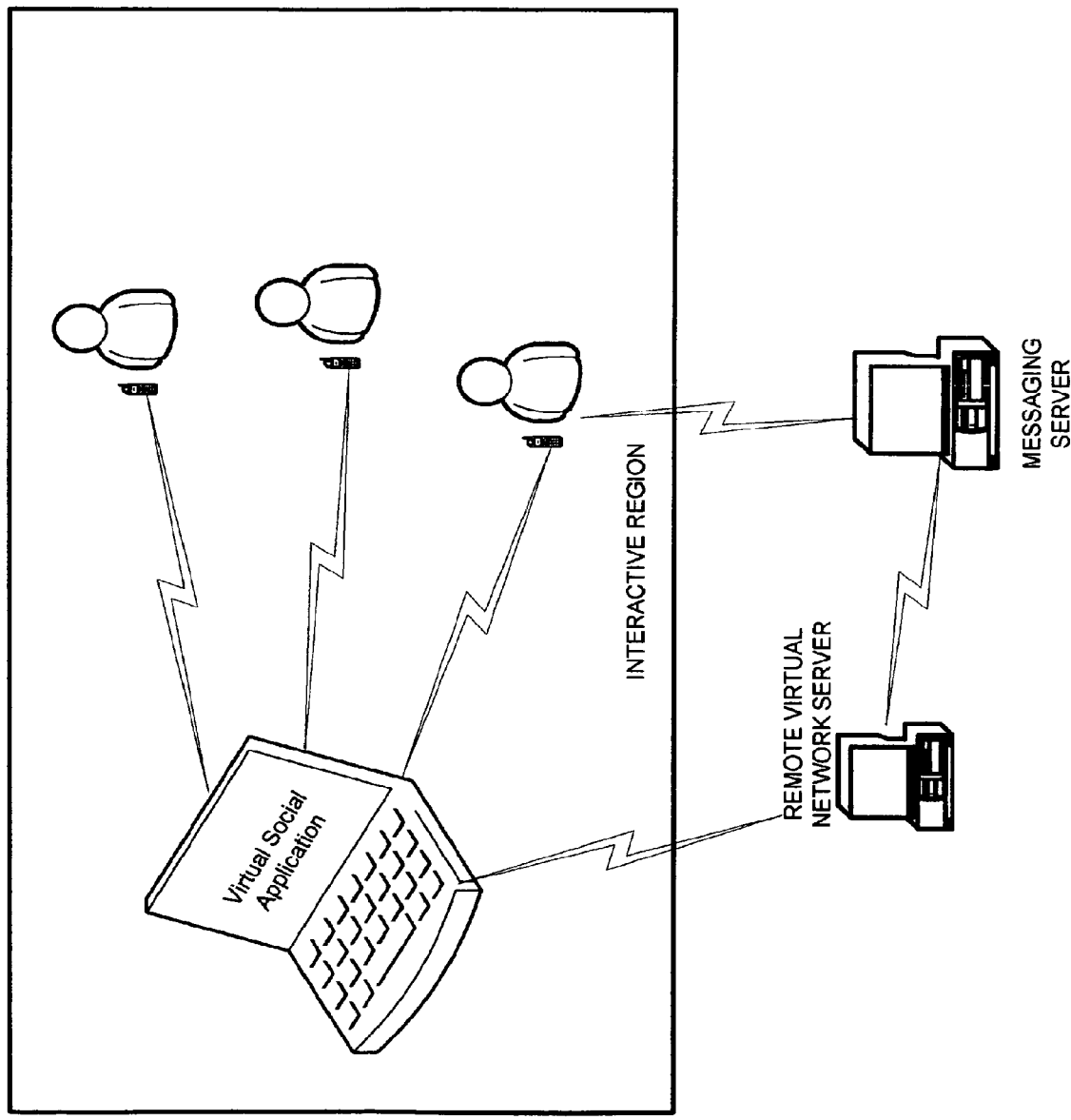
FIG. 14 shows an exemplary arrangement of a system in accordance with some embodiments of the present invention, including a mobile device (e.g. laptop, pda, mobile phone etc.) which is functioning as a local virtual server.
Figure 15:
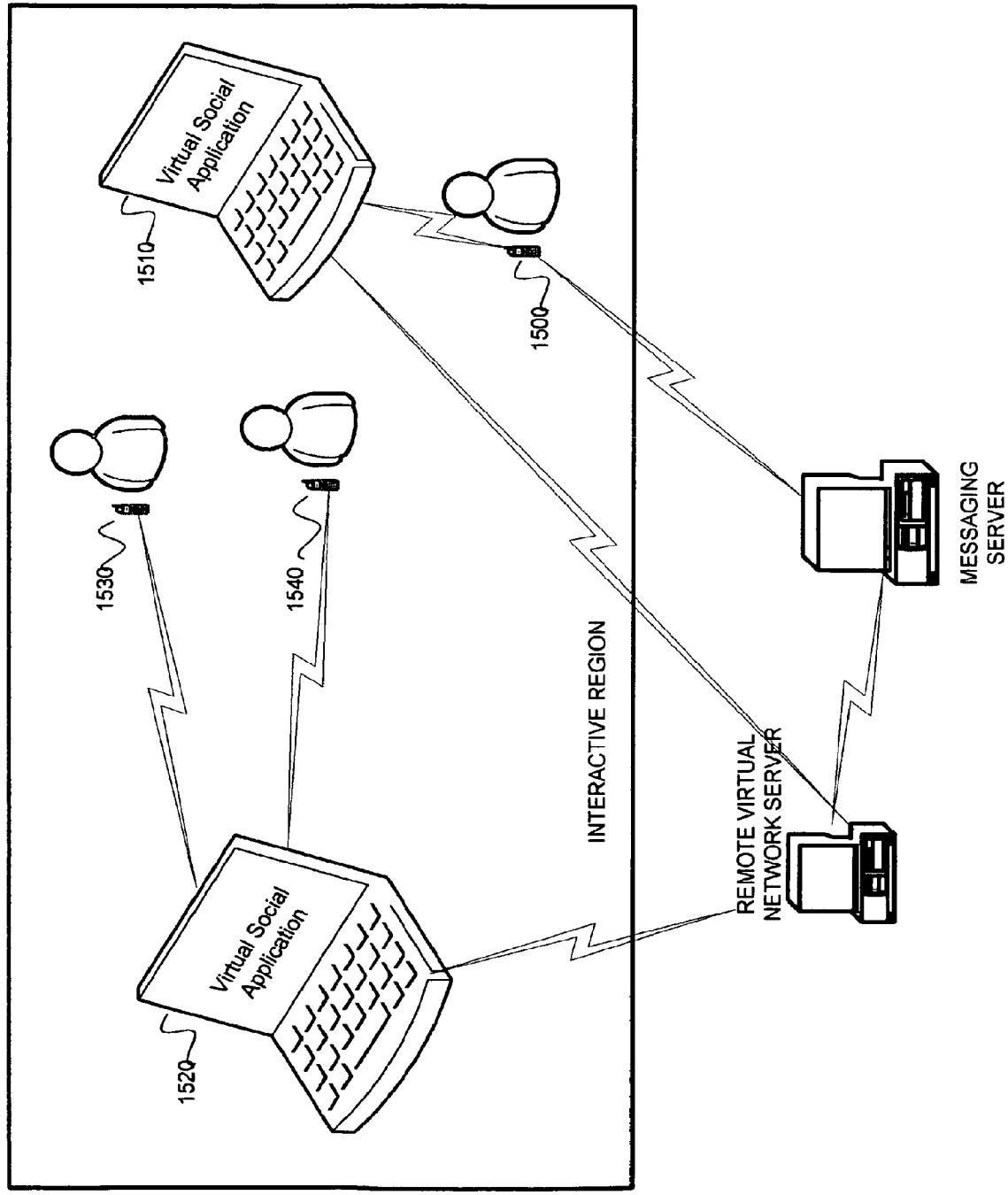
FIG. 15 shows an exemplary arrangement of a system in accordance with some embodiments of the present invention, including one or more mobile devices (e.g. laptop, pda, mobile phone etc.) which are functioning as local virtual servers.

Turning now to FIGS. 14 and 15, there are shown exemplary arrangements of the system in accordance with some embodiments of the present invention. According to some embodiments of the present invention, the system may include a mobile device (e.g. laptop, PDA, mobile phone etc.) which is adapted to operate as a local virtual server functionally coupled with an electromagnetic transceiver and detector (e.g. a laptop with Bluetooth transceiver, a mobile device coupled with an operating system and a Bluetooth transceiver etc.). FIG. 15 shows an arrangement with more than one local virtual server, in this arrangement each local server is a "node" which is coupled with an interactive region. According to some embodiments of the present invention, the remote virtual server may be adapted to manage the interactive region by joining the detected devices by each local server, and tunneling the data\messages to the appropriate local servers and/or mobile devices.

An example of such management may be given in FIG. 15, showing a system which includes a remote server, a messaging server, two local servers ("mobile server", "dynamic server", "dynamic agents") populating one interactive region, which interactive region is currently populated with three communication devices (1500, 1530 and 1540). Communication device 1500 is detected by dynamic agent 1510 and is communicated with by the messaging server. Communication device 1530 and 1540 are detected by dynamic agent 1520 which is also the one sending them messages (i.e. the remote server is tunneling messages which have 1530 and 1540 as recipients via dynamic agent 1520).

Turning now to FIG. 16, there is shown a flow chart depicting the steps of an association process between a communication device and the system in accordance with some embodiments of the present invention. According to some embodiments of the present invention, the system may detect a communication device (step 1600), this may happen when the communication device entered an interactive region, or when a "dynamic agent" was activated in proximity to the device. According to further embodiments of the present invention, the system may extract unique (identifying) parameters from the communication device as described herein above (step 1610). According to further embodiments of the present invention, the system may be adapted to send the communication device a registration message (step 1620), according to some further embodiments of the present invention, such a message may be an HTML message with a unique link, a text message with a unique code and web site address to enter the code, and or any other message which will comprise means of authenticating the device. According to further embodiments of the present invention, the registration message may be sent to the communication device based on the extracted parameters (e.g. if one of the parameters is a MAC address of a Bluetooth transceiver, the message may be sent to the transceiver based on the extracted MAC address). According to further embodiments of the present invention, the system may associate the extracted parameters (i.e. the unique identifiers of the communication device) with data received from the user as shown in step 1640 (e.g. the user followed a unique HTML link and entered its name or associated a virtual profile). This may best be understood in conjunction with the system described in FIG. 1.

According to some embodiments of the present invention, the system may gather parameters associated with the electromagnetic radiation of a communication device. According to yet further embodiments of the present invention, the system may gather the parameters in a passive way (e.g. sensing) or using active procedures (e.g. SDP, queries, etc.).

According to some embodiments of the present invention, data sent to a communication device from the (1) local server, (2) remote server and/or (3) messaging server may be sent using SMS's, MMS's, hyperlinks, Bluetooth messages and/or any other type of message known today or to be devised in the future.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A system comprising:
   a mobile communication device comprising:
      a processor;
      a first memory;
      an electromagnetic radiation receiver, sensor or detector; and
      an electromagnetic transmitter; and
   a remote server comprising a server coupled to a second memory and communication circuitry configured to communicate with said mobile communication device over a distributed data network; wherein:
   (1) the mobile communication device is adapted to receive, sense or detect electromagnetic radiation emitting from a first wireless device, which electromagnetic radiation does not bear a signal addressed to said mobile communication device;
   (2) the mobile communication device is further adapted to detect, extract and transmit to said remote server parameters associated with the electromagnetic radiation emitting from the first wireless device;
   (3) the remote server is further adapted to receive the parameters associated with said electromagnetic radiation and retrieve data associated with the first wireless device, based on said parameters; and
   (4) the remote server transmits the retrieved data to the mobile communication device.

2. The system according to claim 1, wherein said electromagnetic radiation is selected from the group consisting of Bluetooth, wifi, wimax and Long Term Evolution (LTE).

3. The system according to claim 1, wherein parameters associated with the electromagnetic radiation include Mac address, services provided or enabled ports.

4. The system according to claim 1, wherein the retrieved data is retrieved from said second memory.

5. The system according to claim 1, wherein said retrieved data includes a location.

6. A method comprising the steps of:
   receiving, sensing or detecting, by a mobile communication device, electromagnetic radiation emitting from a wireless device, which electromagnetic radiation does not bear a signal addressed to the mobile communication device;
   detecting, by the mobile communication device, parameters associated with the electromagnetic radiation;
   extracting the parameters;
   transmitting the parameters to a remote server via a distributed data network; retrieving, by the remote server, data associated with the wireless device, based on the parameters; and transmitting the retrieved data from the remote server to the mobile communication device.

7. The method according to claim 6, wherein said electromagnetic radiation is selected from the group consisting of Bluetooth, wifi, wimax and Long Term Evolution (LTE).

8. The method according to claim 6, wherein parameters associated with the electromagnetic radiation include Mac address, services provided or enabled ports.

9. The method according to claim 6, wherein said data associated with the wireless device is retrieved from a memory functionally associated with the remote server.

10. The method according to claim 6, wherein said retrieved data includes a location.

11. A mobile communication device comprising:
    a processor;
    a first memory;
    an electromagnetic radiation receiver, sensor or detector; and
    an electromagnetic transmitter;
    wherein:
    said mobile communication device is adapted to: (1) receive, sense or detect electromagnetic radiation emitting from a first wireless device, which electromagnetic radiation does not bear a signal addressed to said mobile communication device; (2) detect, extract and transmit parameters associated with the electromagnetic radiation emitting from the first wireless device;
    transmit, via a distributed data network, the parameters associated with the electromagnetic radiation to a remote server; and
    receive, from the remote server, data associated with the wireless device retrieved, by the remote server, based on the transmitted parameters.

12. The device according to claim 11, wherein said electromagnetic radiation is selected from the group consisting of Bluetooth, wifi, Long Term Evolution (LTE) and wimax.

13. The device according to claim 11, wherein parameters associated with the electromagnetic radiation include Mac address, services provided or enabled ports.

14. The device according to claim 11, wherein said data associated with the wireless device is retrieved from a memory functionally associated with the remote server.

15. The device according to claim 11, wherein said data associated with the wireless device includes a location.

* * * * *